Aug. 26, 1969  A. F. GRANT  3,463,087
CONTROL RESPONSE VALVE FOR HYDROSTATIC TRANSMISSION
Filed Oct. 16, 1967
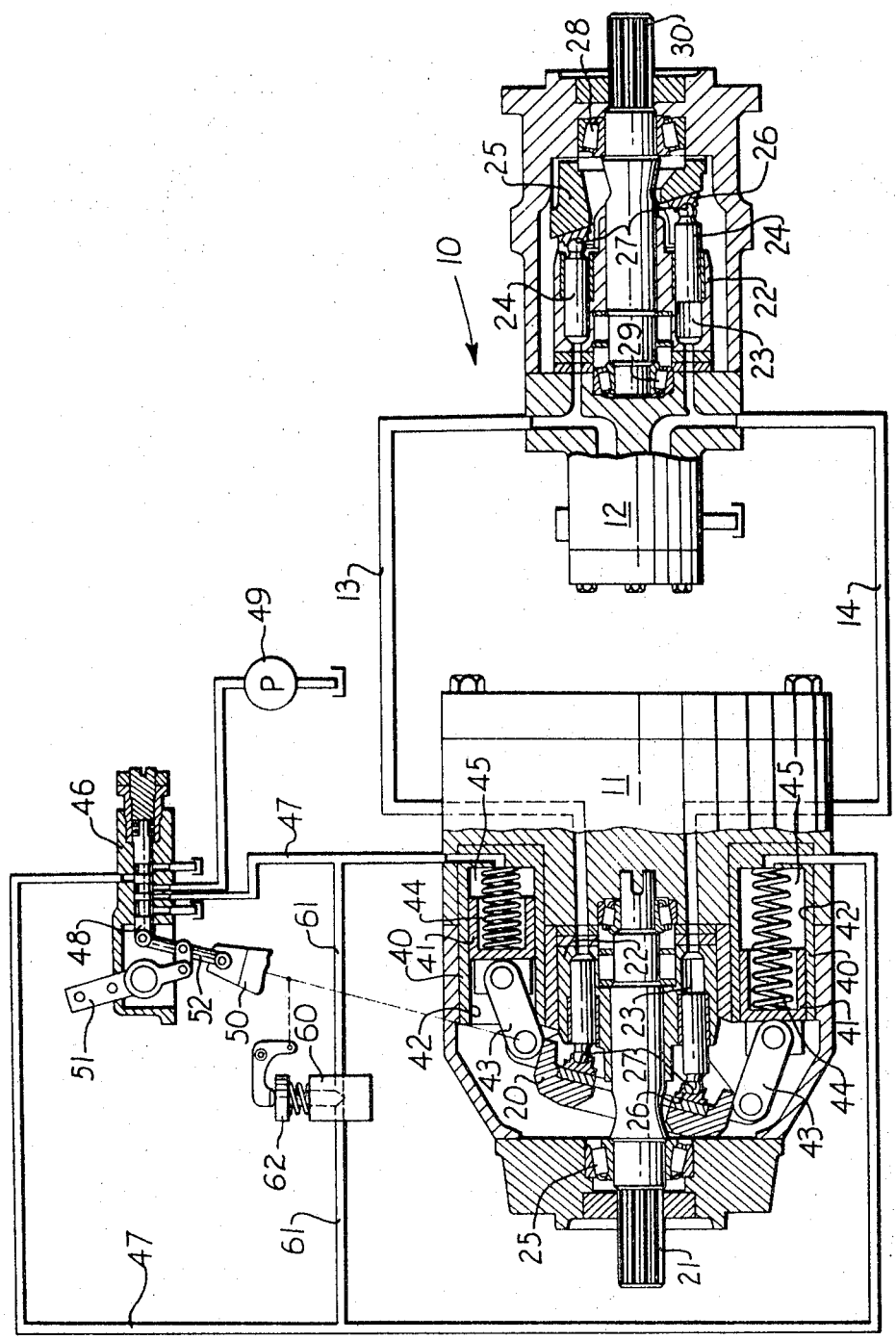
INVENTOR
ARTHUR F. GRANT
BY
Fryer, Tjensvold, Feix, Phillips + Lempio
ATTORNEYS United States Patent Office 3,463,087
Patented Aug. 26, 1969

3,463,087
CONTROL RESPONSE VALVE FOR HYDROSTATIC TRANSMISSION
Arthur F. Grant, East Cleveland, Ohio, assignor to Towmotor Corporation, Cleveland, Ohio, a corporation of Ohio
Filed Oct. 16, 1967, Ser. No. 675,373
Int. Cl. F04b 49/00, 1/02; F04d 15/00
U.S. Cl. 103—38                1 Claim

ABSTRACT OF THE DISCLOSURE

A hydrostatic transmission having a pump whose displacement is controlled by a fluid ram and a servo loop. The servo loop has a manual displacement control valve and an adjustable metering valve which controls the rate of ram response to the movement of the manual control valve. The manual control valve and the metering valve are connected by linkage for simultaneous movement.

BACKGROUND OF THE INVENTION

Hydrostatic transmissions, in which power transfer is accomplished by fluid flow circulating in a closed loop system between a fluid pump and fluid motor, offer many advantages in work vehicles. In particular such transmissions provide lift trucks and similar vehicles with smooth, infinite control of speed in both directions and dynamic braking, while eliminating clutches, torque convertors, gears, and associated friction elements.

Since hydrostatic transmissions offer an infinitely variable speed selection within their designed speed range, it is generally the practice to keep the engine or prime mover speed constant, thereby obtaining maximum engine efficiency. Changes in speed and direction are usually accomplished by changing the displacement of the pump but speed can be also increased by decreasing the displacement in the motor after a speed range has been achieved where torque is less important. Generally, in such a system a control lever, such as a foot pedal, may be employed to control the degree and/or direction of pump displacement through actuating or control rams for adjusting vehicle speed. Since the engine speed is constant the response to a given amount movement of the control pedal will normally be identical for a given control signal. Generally, the rate of response in most hydrostatic transmissions is a specific, set, response time which is selected as a compromise.

Hydrostatic transmissions may be more flexible by including means whereby the response rate of the control system may be varied by the operator. This will allow the operator to select a response-rate best suited for each particular endeavor, thereby increasing overall efficiency and will overcome the need of working with a fixed response rate in the control system.

SUMMARY OF THE INVENTION

In a hydrostatic transmission having a variable displacement pump whose displacement is controlled by fluid ram system through a servo control loop, an adjustable response unit comprising a valve means connected between the opposite sides of said fluid ram system whereby the fluid ram flow can be adjusted, thereby adjusting the rate of response.

DESCRIPTION OF THE DRAWING

The accompanying drawing illustrates the pump and motor unit, with parts broken away, of a hydrostatic transmission and shows the variable response valve connected between the pressure lines leading to and from the ram system controlling the swashplate angle of the pump.

DESCRIPTION OF AN EMBODIMENT

Hydrostatic transmission 10 shown in the drawing includes a fluid pump 11 and a fluid motor 12, both units of the conventional axial-pistons-type, connected in a fluid loop with conduits 13 and 14. Depending upon the angular position of the swashplate 20, with input shaft 21 being rotatably driven by a powering unit, fluid may be pumped through one conduit and returned through the other, thereby driving the motor. Fluid passing through the motor drives its output shaft 30 in a direction consistent with the fluid flow and it should be appreciated, when the vehicle is decelerating, the inertia will tend to cause the power flow in the transmission to reverse, with a motor acting as a pump and the pump as a motor providing dynamic braking.

Both the pump and motor are similar, each having a circular cylinder block 22 with a plurality of axial bores 23, each having a piston 24 reciprocally mounted therein. When the pistons are reciprocated in their associated bore, fluid is introduced or discharged from the bore through a valve plate means having two arcuate ports which cooperate with the cylinder ports at the valve end of the cylinder block. This design is conventional in axial piston type pumps and patents relating thereto may be referred to for a more detailed description.

By changing the degree of reciprocation of the pistons in the pump, the displacement of the pump can be varied from zero to maximum output in one direction or maximum output in the opposite direction, without any change of direction of the input shaft. In the pump, the degree of reciprocation is controlled by a swash plate, while in the motor a fixed bearing block 25 is mounted in the case and keeps the displacement of the motor constant. Both the pump and motor unit have a thrust ring 26 with socket means 27 cooperating with the ball ends of the pistons 24 to retain them during reciprocation. This thrust ring rotates or tracts on a bearing surface, such as a swashplate in the pump or the bearing block in the motor, as these cylinder blocks rotate on their associated shafts. and bearings 28 and 29.

Only the rudimentary components of the hydrostatic transmission are described above and the other components, such as replenishing pumps for charging the system, relieve valves, make up valves and similar components are well known in the art and not specifically shown or described herein. For a more detailed discussion of these components reference is made to U.S. Patent No. 3,212,263 issued to Hann.

In the embodiment in the drawing the position or angle of the swashplate is controlled by a ram system composed of rams 40 whose pistons 41 reciprocate in bores 42 in the transmission case and are pivotally connected to the opposite sides of the swashplate with links 43. Springs 44 bias the pistons to a neutral position and since the swashplate is tiltable about a trunnion axis, or mount (not shown), the pistons will move in opposite directions when a change in the displacement of the pump occurs. Obviously, a single, double ended ram could be employed in place of the two separate single ended rams, however, the separate ram units are used to illustrate the invention.

The chamber 45 behind each ram piston is in communication through conduits 47 with a control valve 46 so that movement of the valve spool 48 will connect one or the other of the chambers to a source of fluid pressure, such as pump 49, and the opposite chamber to reservoir through appropriate conduits.

Position of the valve spool is controlled by the respective positions of arm 50 driven through a connection with the swashplate and the operator control device 51, through a linkage bar 52, to which both are connected. Thus, if the operator control device is moved, the valve spool will be displaced in one direction, or the other, depending on the direction of movement of the operator device until the arm, connected to the swashplate, moves sufficiently to return the valve spool to neutral. This is a simple servo-follow-loop for controlling the pump displacement and enables the operator to select any intermediate displacement from zero to full displacement in either direction.

In the instant invention an adjustable valve 60 is connected between conduits 47 leading to the control valve 46, as shown in the drawing, with conduits 61. This valve is a conventional screw type with an adjustment knob 62, by which the flow rate through the valve may be varied progressively from zero flow to the maximum capable of passing through the valve. Adjustment of this valve controls the response rate of the ram system which is changing the displacement of the pump.

More specifically, when the pump displacement is being increased with the valve in an open position, it will allow some of the fluid, moving toward one of the fluid rams operating to increase displacement, to drain to the reservoir. This will tend to slow down the response of the swashplate to the control input. Obviously, opening the valve a greater amount will tend to slow the response still further.

Conversely, if the swashplate is being adjusted toward a lower pump displacement part of the fluid, which would normally be vented from the pressurized ram to reservoir, can cross-flow to the opposite non-pressurized ram, thus allowing the swashplate to return to neutral faster since a greater amount of pressurized fluid is available and the springs and forces on the swashplate will tend to drive it to a neutral position.

The tendency to slow down the swashplate response when operating to increase displacement from neutral toward full position is negligible except for very large openings of valve 60, since an abundant supply of pressurized fluid is usually available from the charge pump 49. However, the effect of increasing the response rate when operating to decrease displacement from full toward neutral position is very pronounced. This is due to permitting the pressurized fluid in the operating ram to assist the return spring force in the non-operating ram, by cross-flow described above. This pressurized fluid also bypasses the normal restrictions associated with the servo control valve 46 ordinarily encountered.

As fluid is always flowing through valve 60 to a limited extent when the transmission is operating, a dynamic conditioner is created in the servo control system. This prevents the servo control from becoming "locked" in full power position as a direct bleed-off of the pressurized fluid to reservoir is always provided. Without valve 60 the "locked" condition frequently occurs creating a hazarous situation for vehicle operation.

The bleed through valve 60 is usually quite small and any movement in the swashplate 20 will reposition arm 50 driven by the swashplate and thus, the valve spool will be displaced through the control linkages to correct for any swashplate drift. Therefore, even though bleed is provided between the end of the ram under a higher pressure and its counterpart under a lower pressure, the servo follow-up loop will present drift in the swashplate.

The response rate will be proportioned to the torque output of the transmission since at higher torque more pressure will be required to increase the swashplate angle, and thus more fluid will pass through the valve opening at the higher pressures.

It is recognized that valve 60 can readily be built into the servo control valve 46 as an integral part thereof. Variations are also possible that will automatically compensate or change the orifice opening of valve 60 dependent upon control pedal operation of device 51. The embodiment shown in the drawing was selected for the purpose of simplicity.

I claim:

1. An apparatus for adjusting the rate of change in pump displacement response in a hydrostatic transmission having a variable displacement pump unit controlled by a fluid ram system including a double acting jack means connected to said pump unit to change its displacement, a control valve means having a source of pressurized fluid connected to said double acting jack means with conduits;

manually operated means tnd follow-up linkage means connected to said control valve means in a servo-loop whereby intermediate displacements of said pump unit can be selected and maintained by operation of said manually operated means;

adjustable metering valve means connected across said conduits connecting said control valve and said double acting means whereby cross flow of fluid between said conduits can be varied to change the rate of response; and members connecting said adjustable metering valve means to said control valve means for changing flow rate through the servo loop as pump displacement changes whereby the rate of change is proportioned to both pump displacement and the torque output of the transmission.

References Cited

UNITED STATES PATENTS

| 425,202 | 4/1890 | Blanchard | 91—437 |
|---|---|---|---|
| 1,773,794 | 8/1930 | Schneider | 91—437 X |
| 2,160,920 | 6/1939 | Strawn | 60—52 |
| 3,171,255 | 3/1965 | Lauck. | |
| 3,180,091 | 4/1965 | Bruno | 103—38 X |
| 3,236,049 | 2/1966 | Reinke. | |
| 3,365,886 | 1/1968 | Moon. | |

DONLEY J. STOCKING, Primary Examiner

W. J. KRAUSS, Assistant Examiner

U.S. Cl. X.R.

60—53; 91—437; 103—162